(12) United States Patent
Witt (10) Patent No.: US 10,011,442 B2
(45) Date of Patent: Jul. 3, 2018

(54) BIN SWEEP SUPPORT

(71) Applicant: William Witt, Harrisburg, SD (US)

(72) Inventor: William Witt, Harrisburg, SD (US)

(73) Assignee: Sioux Steel Company, Sioux Falls, SD (US)

( * ) Notice: Subject to any disclaimer, the term of this patent is extended or adjusted under 35 U.S.C. 154(b) by 0 days.

(21) Appl. No.: 14/612,768

(22) Filed: Feb. 3, 2015

(65) Prior Publication Data

US 2015/0225190 A1    Aug. 13, 2015

Related U.S. Application Data (60) Provisional application No. 61/937,857, filed on Feb. 10, 2014.

(51) Int. Cl.
| | | |
|---|---|---|
| *B65G 65/40* | (2006.01) | |
| *B65G 65/42* | (2006.01) | |
| *B65G 65/46* | (2006.01) | |

(52) U.S. Cl.
CPC .......... *B65G 65/425* (2013.01); *B65G 65/46* (2013.01); *B65G 65/466* (2013.01); *B65G 65/40* (2013.01)

(58) Field of Classification Search
CPC ...... B65G 65/40; B65G 65/42; B65G 65/425; B65G 65/46; B65G 65/466
USPC .......................................................... 414/502
See application file for complete search history.

(56) References Cited

U.S. PATENT DOCUMENTS

| | | | |
|---|---|---|---|
| 822,547 A | 6/1906 | Nicolson | |
| 2,646,023 A | 7/1953 | Virgil | |
| 2,763,362 A | 9/1956 | Greaves | |
| 2,801,137 A | 7/1957 | Clay | |

(Continued)

FOREIGN PATENT DOCUMENTS

| | | |
|---|---|---|
| CA | 2312068 | 12/2001 |
| FR | 1032110 | 6/1953 |

(Continued)

OTHER PUBLICATIONS

G & G Manufacturing SC-X 4 Ratchet Slip Clutches, Jun. 17, 2012, https://web.archive.org/web/20120617003451/http://www.ggmfg.com/Products/CouplersClutches/SCX4RatchetSlipClutches.aspx.
Sudenga Industries, Inc., Press Release, Nov. 1, 2004, pp. 1-3.

*Primary Examiner* — Anna M Momper
*Assistant Examiner* — Ashley K Romano
(74) *Attorney, Agent, or Firm* — Jeffrey A. Proehl; Woods, Fuller, Shultz & Smith, P.C.

(57) ABSTRACT

A sweep assembly rotatable along a sweep path in a bin and comprising a housing, a particulate sweep assembly to move particulate matter, and a sweep drive assembly to move the sweep assembly across the floor surface. At least one support assembly may have a support condition characterized by the support assembly providing support to the housing of the sweep assembly and a non-support condition characterized by the support assembly not providing support to the housing. The support assembly may change from the support condition to the non-support condition by movement of the sweep assembly along the sweep path. In some embodiments, the support assembly may comprise a sweep-mounted component moving with the sweep assembly along the sweep path and a floor-mounted component being stationary with respect to movement of the sweep assembly along the sweep path.

20 Claims, 12 Drawing Sheets

(56) References Cited

U.S. PATENT DOCUMENTS

| | | | | |
|---|---|---|---|---|
| 3,014,575 | A | 12/1961 | Klein | |
| 3,035,718 | A | 5/1962 | Behlen | |
| 3,065,996 | A | 11/1962 | Patz | |
| 3,067,914 | A | 12/1962 | Ellaby | |
| 3,175,676 | A | 3/1965 | Vander Schaff | |
| 3,181,715 | A | 5/1965 | Olson | |
| 3,204,786 | A | 9/1965 | Kucera | |
| 3,228,514 | A | 1/1966 | Kucera | |
| 3,229,665 | A | 1/1966 | Baltz | |
| 3,229,827 | A | 1/1966 | Kucera | |
| 3,231,106 | A | 1/1966 | Bruecker | |
| 3,291,325 | A | 12/1966 | Henningson | |
| 3,297,146 | A | 1/1967 | Munger | |
| 3,338,636 | A | 8/1967 | Chapman | |
| 3,438,517 | A | 4/1969 | Steffen | |
| 3,451,567 | A * | 6/1969 | Laidig | B65G 65/466 |
| | | | | 198/661 |
| 3,455,470 | A | 7/1969 | Kanagy | |
| 3,472,357 | A | 10/1969 | Strocker | |
| 3,486,643 | A * | 12/1969 | Smith | B65G 65/466 |
| | | | | 414/312 |
| 3,647,094 | A | 3/1972 | Jackson | |
| 3,828,916 | A | 8/1974 | Patz | |
| 3,838,780 | A | 10/1974 | Ridlehuber | |
| 3,908,840 | A | 9/1975 | Lambert | |
| 3,946,861 | A | 3/1976 | Sandefur | |
| 3,974,908 | A | 8/1976 | Keichinger | |
| 3,986,600 | A | 10/1976 | Pentith | |
| 4,022,335 | A | 5/1977 | Lambert | |
| RE29,309 | E * | 7/1977 | Patterson | B65G 65/466 |
| | | | | 414/310 |
| 4,057,151 | A * | 11/1977 | Weaver | A01F 25/2018 |
| | | | | 414/311 |
| 4,230,222 | A | 10/1980 | Clark | |
| 4,242,028 | A | 12/1980 | Van Dusen | |
| 4,313,705 | A | 2/1982 | Jackson | |
| 4,329,105 | A | 5/1982 | Buschbom | |
| 4,451,192 | A | 5/1984 | Wood | |
| 4,516,898 | A | 5/1985 | Cantenot | |
| 4,583,903 | A | 4/1986 | Hutchison | |
| 4,619,330 | A | 10/1986 | Machnee | |
| 4,619,577 | A | 10/1986 | Swanson | |
| 4,621,968 | A | 11/1986 | Hutchison | |
| 4,655,666 | A | 4/1987 | Cantenot | |
| 4,658,911 | A | 4/1987 | Drever | |
| 4,669,941 | A | 6/1987 | West | |
| 4,762,220 | A | 8/1988 | Lutke | |
| 4,773,808 | A | 9/1988 | Fischer | |
| 4,775,278 | A | 10/1988 | Fischer | |
| 4,824,312 | A | 4/1989 | Schiltz | |
| 4,875,820 | A | 10/1989 | Lepp | |
| 4,998,855 | A | 3/1991 | Tschernatsch | |
| 5,088,871 | A | 2/1992 | Mellish | |
| 5,099,983 | A | 3/1992 | Valdez | |
| 5,186,596 | A | 2/1993 | Boucher | |
| 5,203,802 | A | 4/1993 | Denis | |
| 5,540,533 | A | 7/1996 | Eskelinen | |
| 5,639,200 | A | 6/1997 | Jiskoot | |
| 5,769,590 | A | 6/1998 | Weikel | |
| 5,788,055 | A | 8/1998 | Stewart | |
| 6,017,180 | A | 1/2000 | Wilham | |
| 6,039,647 | A | 3/2000 | Weikel | |
| 6,203,261 | B1 | 3/2001 | South | |
| 6,254,329 | B1 | 7/2001 | Sukup | |
| 6,280,331 | B1 | 8/2001 | Tuttlebee | |
| 6,281,610 | B1 | 8/2001 | Kliman | |
| 6,499,930 | B1 | 12/2002 | Dixon | |
| 6,640,451 | B1 | 11/2003 | Vinarcik | |
| 6,948,902 | B2 | 9/2005 | Hanig | |
| 7,210,538 | B2 | 5/2007 | Gust | |
| 7,544,031 | B2 | 6/2009 | Kaeb | |
| 7,588,405 | B2 | 9/2009 | Johnson | |
| 7,967,542 | B2 | 6/2011 | Epp | |
| 8,657,025 | B2 | 2/2014 | Thompson | |
| 8,770,388 | B1 | 7/2014 | Chaon | |
| 2004/0146381 | A1 | 7/2004 | Hanson | |
| 2004/0213650 | A1 * | 10/2004 | Epp | B65G 65/466 |
| | | | | 414/310 |
| 2005/0254922 | A1 | 11/2005 | Berraeu | |
| 2005/0263372 | A1 | 12/2005 | Hollander | |
| 2006/0245864 | A1 | 11/2006 | Epp | |
| 2006/0285942 | A1 | 12/2006 | Fridgen | |
| 2010/0239399 | A1 | 9/2010 | Hoogestraat | |
| 2013/0064629 | A1 | 3/2013 | Schuelke | |
| 2013/0216341 | A1 | 8/2013 | Luster | |

FOREIGN PATENT DOCUMENTS

| | | |
|---|---|---|
| FR | 2309442 | 11/1976 |
| FR | 2348132 | 11/1977 |
| FR | 2630620 | 11/1989 |
| GB | 1327791 | 8/1973 |
| GB | 2069448 | 8/1981 |
| GB | 2076357 | 12/1981 |

* cited by examiner

BIN SWEEP SUPPORT

REFERENCE TO RELATED APPLICATION

This application claims the benefit of U.S. Provisional Patent Application No. 61/937,857, filed on Feb. 10, 2104, which is hereby incorporated by reference in it's entirety.

BACKGROUND

Field

The present disclosure relates to bin sweeps and more particularly pertains to a new bin sweep support which may be changed from a support condition to a non-support condition by movement of the sweep.

SUMMARY

In one aspect, the disclosure relates to a bin sweep system for a bin having a floor surface and a central well. The system may comprise a sweep assembly configured to move in a forward direction across the floor surface, with the sweep assembly having an inboard end for positioning toward the central well of the bin and an outboard end of the sweep assembly, the sweep assembly being rotatable along a sweep path in which the sweep path includes a plurality of positions of the bin sweep. The sweep assembly may comprise a housing having a longitudinal axis extending between the inboard and outboard ends of the sweep assembly, a particulate sweep assembly mounted on the housing and configured to move particulate matter across the floor surface toward the central well, and a sweep drive assembly mounted on the housing and configured to move the sweep assembly across the floor surface. At least one support assembly may have a support condition characterized by the support assembly providing support to the housing of the sweep assembly and a non-support condition characterized by the support assembly not providing support to the housing. The support assembly may change from the support condition to the non-support condition by movement of the sweep assembly along the sweep path.

In another aspect, the disclosure relates to a bin sweep system for a bin having a floor surface and a central well. The system may comprise a sweep assembly configured to move in a forward direction across the floor surface, with the sweep assembly having an inboard end for positioning toward the central well of the bin and an outboard end of the sweep assembly, the sweep assembly being rotatable along a sweep path in which the sweep path includes a plurality of positions of the bin sweep. The sweep assembly may comprise a housing having a longitudinal axis extending between the inboard and outboard ends of the sweep assembly, a particulate sweep assembly mounted on the housing and configured to move particulate matter across the floor surface toward the central well, and a sweep drive assembly mounted on the housing and configured to move the sweep assembly across the floor surface. At least one support assembly may comprise an elongate leg extending downwardly from the housing of the sweep assembly and having a lower surface, and a pedestal immovably mounted on the floor with a raised surface raised with respect to a plane of the floor surface of the bin. The lower surface of the leg may rest upon the raised surface of the pedestal when the sweep assembly is in a park position of the sweep path, and the leg may be removed from engagement from the pedestal when the sweep assembly is moved from the park position of the sweep path and a gap being formed between the lower surface of the leg and the floor surface.

There has thus been outlined, rather broadly, some of the more important elements of the disclosure in order that the detailed description thereof that follows may be better understood, and in order that the present contribution to the art may be better appreciated. There are additional elements of the disclosure that will be described hereinafter and which will form the subject matter of the claims appended hereto.

In this respect, before explaining at least one embodiment or implementation in greater detail, it is to be understood that the scope of the disclosure is not limited in its application to the details of construction and to the arrangements of the components set forth in the following description or illustrated in the drawings. The disclosure is capable of other embodiments and implementations and is thus capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present disclosure. It is important, therefore, that the claims be regarded as including such equivalent constructions insofar as they do not depart from the spirit and scope of the present disclosure.

The advantages of the various embodiments of the present disclosure, along with the various features of novelty that characterize the disclosure, are disclosed in the following descriptive matter and accompanying drawings.

BRIEF DESCRIPTION OF THE DRAWINGS

The disclosure will be better understood and when consideration is given to the drawings and the detailed description which follows. Such description makes reference to the annexed drawings wherein.

DETAILED DESCRIPTION

With reference now to the drawings, and in particular to FIGS. 1 through 12 thereof, a new bin sweep support embodying the principles and concepts of the disclosed subject matter will be described.

Jacks are commonly used to support bin sweeps in the parked, inactive mode, such as when the bin is being filled with grain, when the bin is then full of grain, and up until the time when the bin sweep is to be operated in the active, operating mode to empty grain from the bin. The jacks may be deployed when the bin sweep is converted from the active, operating or sweep mode to the parked mode. Deployment may include rotating the jacks about a horizontal axis from a generally horizontal orientation to a generally vertical orientation, and a hand crank on the jack may then be cranked to lower the lower end of the jack so that the lower end is brought into contact with the floor, and the sweep may be raised upwardly such that the jacks at least partially support the sweep. Conversely, when the sweep is to be operated, the jacks then need to be stored by cranking the lower end of the jack up out of contact with the floor surface, and the jack rotated from a vertical orientation to a horizontal orientation.

When the bin sweep is in a parked mode, it is often parked in a park position along the auger that extends radially from the center sump beneath the floor and also along one or more intermediate sumps in the floor that empty into the auger. The parked position is located adjacent to the intermediate sumps with the sumps in front of the sweep so that when the in-floor auger is operated, the area of the bin in front of the bin sweep (and in the direction that the bin sweep is to move), is at least partially cleared of grain to facilitate the initial movement of the sweep. In conventional practice, once this area has been at least partially cleared of grain, a person needs to enter the interior of the bin and retract the jacks from the deployed position so that the jacks no longer contact the floor or support the sweep. The bin sweep may then begin operation with movement forward across the bin floor.

The use of the jacks, while generally effective, has disadvantages. Use of the jacks requires that a person enter the bin when it is partially filled with large amounts of grain to move all of the jacks into the stored position. A person must also reenter the bin after it has been emptied to deploy the jacks to support the bin sweep while the bin is empty until the sweep is to be used again. Also, after a period of use, the jacks may fail and require repair or replacement.

Applicants have recognized that the operation of the jacks requires additional labor that must be performed in the dangerous environment of a partially-filled bin interior in which disturbance of the grain pile may cause collapse of the pile onto the person. The applicants have developed an alternative to the jack that does not require a person to enter the bin interior to initiate operation of the bin sweep and does not include moving parts for less maintenance.

Figure 1:
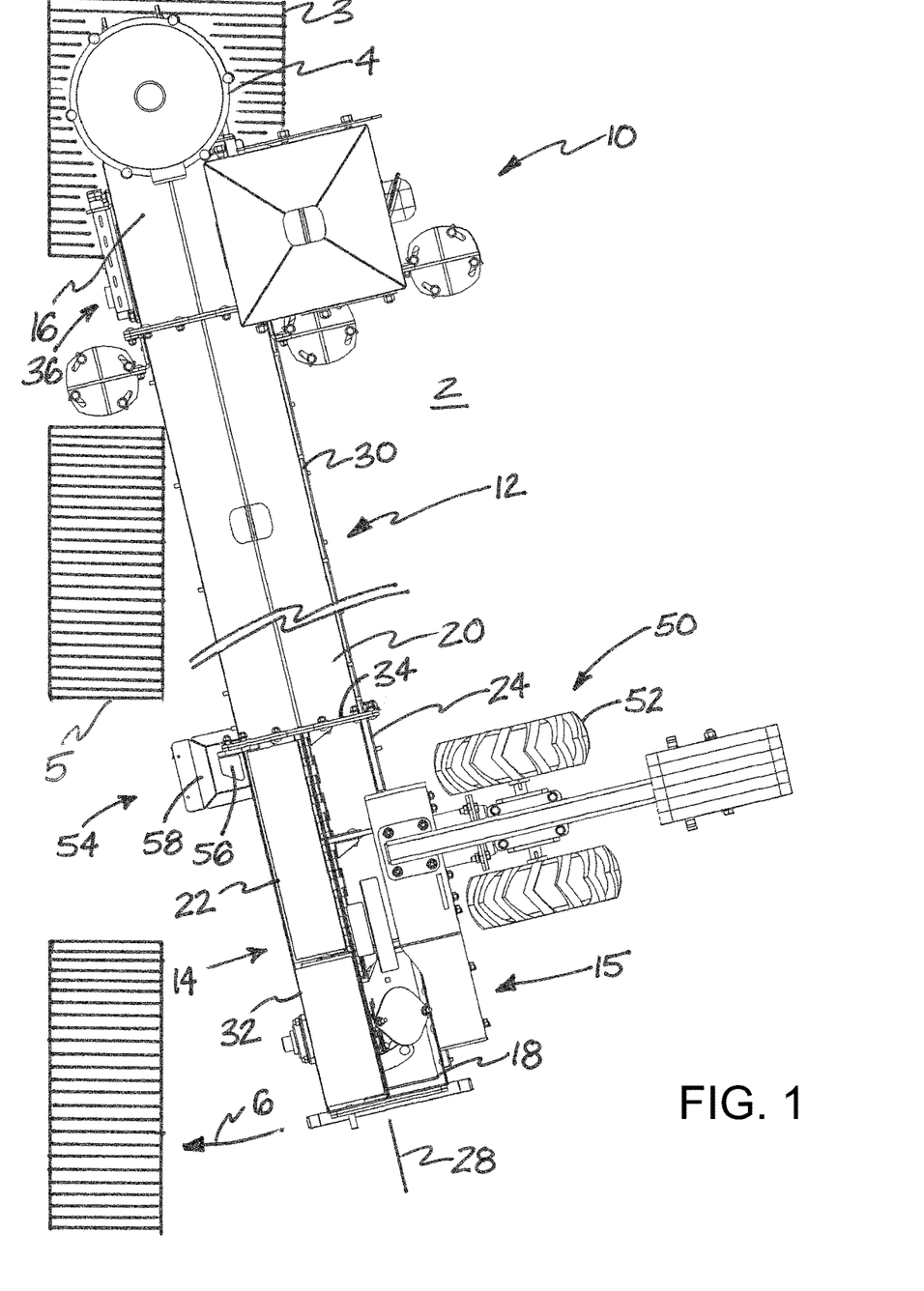
FIG. 1 is a schematic top view of a new bin sweep support on a bin sweep assembly in a bin, according to the present disclosure.

In a general sense, the disclosure relates to a bin sweep system 10 which is highly suitable for use in some embodiments in a bin having a floor surface 2 on which the system 10 is typically rested. The floor may be of any suitable character and may be formed such that the floor surface is generally substantially planar, but need not be perfectly so. The bin typically has a central sump or well 3 into which particulate matter, such as particles of grain, are moved by the system 10 for removal from the interior of bin by any suitable apparatus, but which usually employs a conveyor or auger beneath the floor surface that moves the particles from the central well to a location outside of a perimeter wall of the bin. One or more intermediate sumps 5 may extend generally along a line radiating from the central sump to the perimeter of the bin, and the line generally corresponds to the path of an in-floor auger carrying particles from the central sump and the intermediate sumps to the exterior of the bin for unloading the bin. A center post 4 may be positioned adjacent to the central well, and may be located at the geometric center of the bin floor, which often has a circular perimeter. The center post may extend upwardly from the floor surface of the bin, and in some installation may carry electrical and/or rotational mechanical power to transmit to the bin sweep for operating the sweep.

The system 10 may comprise a sweep assembly 12 that is configured to move in a forward direction across the floor surface 2 of the bin. The sweep assembly may have a front 14 for orienting toward the forward direction of movement of the sweep assembly and a rear 15 for orienting away from the forward direction of movement. The sweep assembly 12 may also have an inboard end 16 for positioning toward the central sump 3 of the bin and an outboard end 18 for positioning radially outwardly from the inboard end, and generally toward the perimeter wall of the bin. The sweep assembly 12 generally rotates about the center post 4 along a sweep path 6 that includes a plurality of positions in which the sweep assembly radiates outwardly from the center post. One position may comprise the park position.

Figure 2:
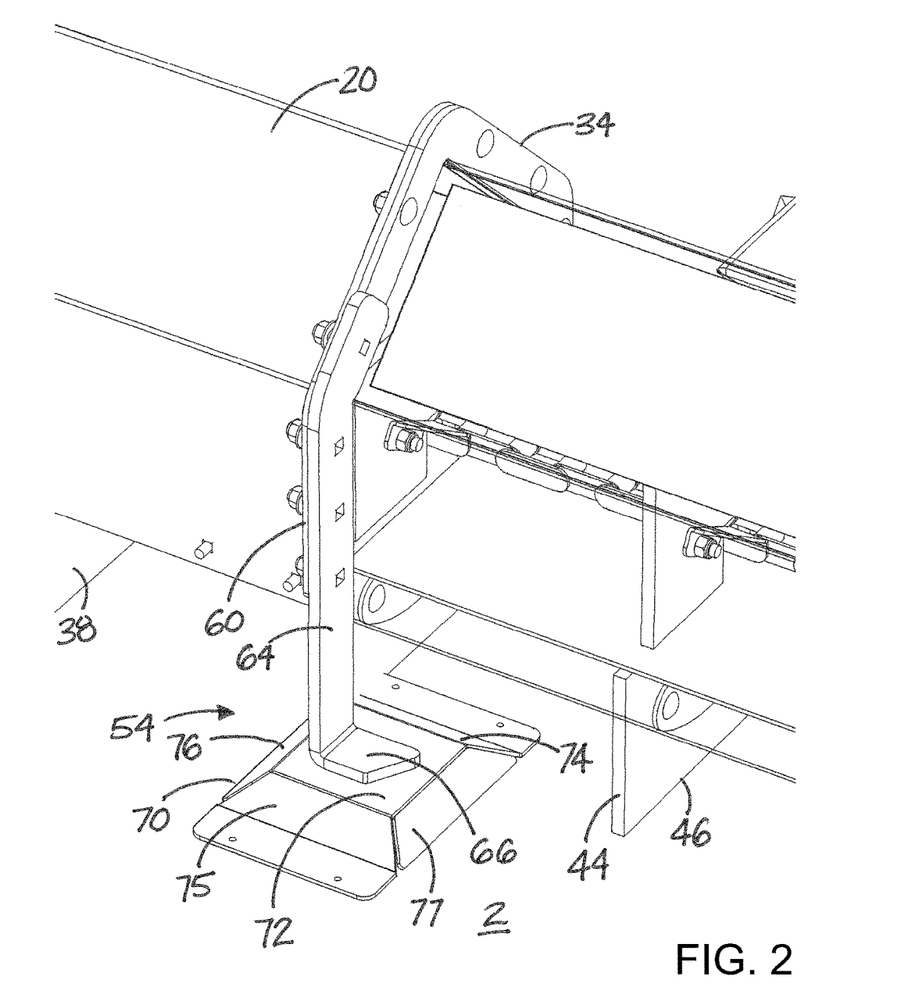
FIG. 2 is a schematic perspective view of a portion of a bin sweep assembly showing the bin sweep support, according to an illustrative embodiment.

The sweep assembly 12 may further comprise a housing 20 that extends substantially the entire length of the sweep assembly between the inboard 16 and outboard 17 ends. The housing 20 has a forward side 22 at the front 14 of sweep assembly and is oriented toward the forward direction. The housing 20 also has a rearward side 24 at the rear 15 of the sweep assembly and is oriented away from the forward direction. The housing 20 may also define an interior 26 that may be partially closed and partially open. The housing 20 may also have a longitudinal axis 28 extending between the inboard 16 and outboard 18 ends of the sweep assembly 12, and that is oriented substantially perpendicular to an axis of rotation of the sweep assembly about the center post 4.

In some embodiments of the sweep assembly, the housing includes a plurality of sections connected together such that the addition or subtraction of sections from the sweep assembly changes and adjusts the length of the housing between the inboard and outboard ends. The plurality of sections may include an inboard section 30 located toward the inboard end 16 and an outboard section 32 located toward the outboard end 18. In some embodiments one or more one intermediate sections may be located between the inboard 30 and outboard 32 sections. The sections may be connected together at junctures 34. A connection structure 36 may be employed to connect the housing 20 to the center post 4 to guide movement of the sweep assembly along the path about the center post. The connection structure 36 may be pivotally connected to the housing, and the inboard section thereof. The connection structure may include at least one arm pivotally connected to the housing and being connected to the center post, and in some preferable embodiments may include a pair of laterally-spaced arms.

The sweep assembly 12 may also include a particulate sweep assembly, which in the illustrative embodiments includes a plurality of interconnected paddles 38 movable in a succession on a path along at least a portion of the length of the sweep assembly between the inboard 16 and outboard 17 ends. Other embodiments may utilize other types of means for moving the particles. The plurality of paddles 38 may be arrayed in an endless loop 40 extending between the inboard and outboard ends of the sweep assembly. The plurality of paddles 38 may be mounted on an endless loop member 42 at spaced locations along the endless loop. In some embodiments, the endless loop member 42 may comprise a series of interconnected links, which may comprise a plurality of chain links. Each of the paddles 40 may have a perimeter edge 44 with a lower edge portion 46 that is positioned close to or in contact with the floor surface of the bin. Movement of the paddles tends to push the particles in front of the respective paddles.

The endless loop 40 may include an inbound extent 48 moving toward the inboard end 16 of the sweep assembly and an outbound extent 49 moving toward the outboard end 18. The inbound extent 48 may contact particles to move the particles toward the inboard end and the outbound extent may be out of contact with the particles until reaching the outboard end. In some embodiments, at least a portion of the endless loop of the plurality of paddles may be positioned in the interior 26 of the housing.

In some embodiments, the endless loop 40 of the plurality of paddles 38 may generally rotate about horizontally-oriented axes, with the inbound extent 48 being a lower extent of the endless loop and the outbound extent 49 being an upper extent of the endless loop. In some other embodiments, the endless loop 40 of the plurality of paddles may generally rotate about vertically-oriented axes, with the inbound extent 48 being a forward extent of the endless loop and the outbound extent 49 being a rearward extent of the endless loop.

The sweep assembly 12 may also include a sweep drive assembly 50 that may be mounted on the housing 20 and configured to move the housing across the floor surface. The sweep drive assembly 50 may be located toward the outboard end 18 of the elongated sweep apparatus. The sweep drive assembly 50 may include one or more wheels 52. In some embodiments, the sweep drive assembly 50 may be driven by movement of the particulate sweep assembly, such as the endless loop 40.

The sweep assembly 12 may also include at least one support assembly 54 for at least partially supporting the housing 20 of the sweep assembly. The support assembly 54 may provide support to the housing at intermittent or limited portions of the sweep path of the sweep assembly, and may be limited to one or possibly more discrete positions of the sweep assembly along the sweep path. The support assembly 54 may provide no support to the housing of the sweep assembly at some positions of the sweep assembly along the sweep path. In some embodiments, the support assembly 54 may provide support to the housing 20 at only one position of the sweep assembly along the sweep path, and may not provide support to the housing at any other position of the sweep assembly. The support assembly 54 may have a support condition (see FIGS. 5 and 7) characterized by the support assembly providing support to the housing of the sweep assembly and a non-support condition (see FIGS. 6 and 8) characterized by the support assembly not providing support to the housing. The position of the sweep assembly along the sweep path may determine if the support assembly is in the support condition or the non-support condition. In some embodiments, the support assembly changes from the support condition to the non-support condition by movement of the sweep assembly along the sweep path, and thus movement of the sweep assembly may be able to change the condition of the support assembly without other intervention. Movement of the sweep assembly may also change the support assembly from the non-support condition to the support condition. It will be appreciated that simple forward movement of the sweep assembly may in many cases be accomplished remotely, from outside the bin, without requiring a person to enter the bin interior to initiate movement.

Figure 3:
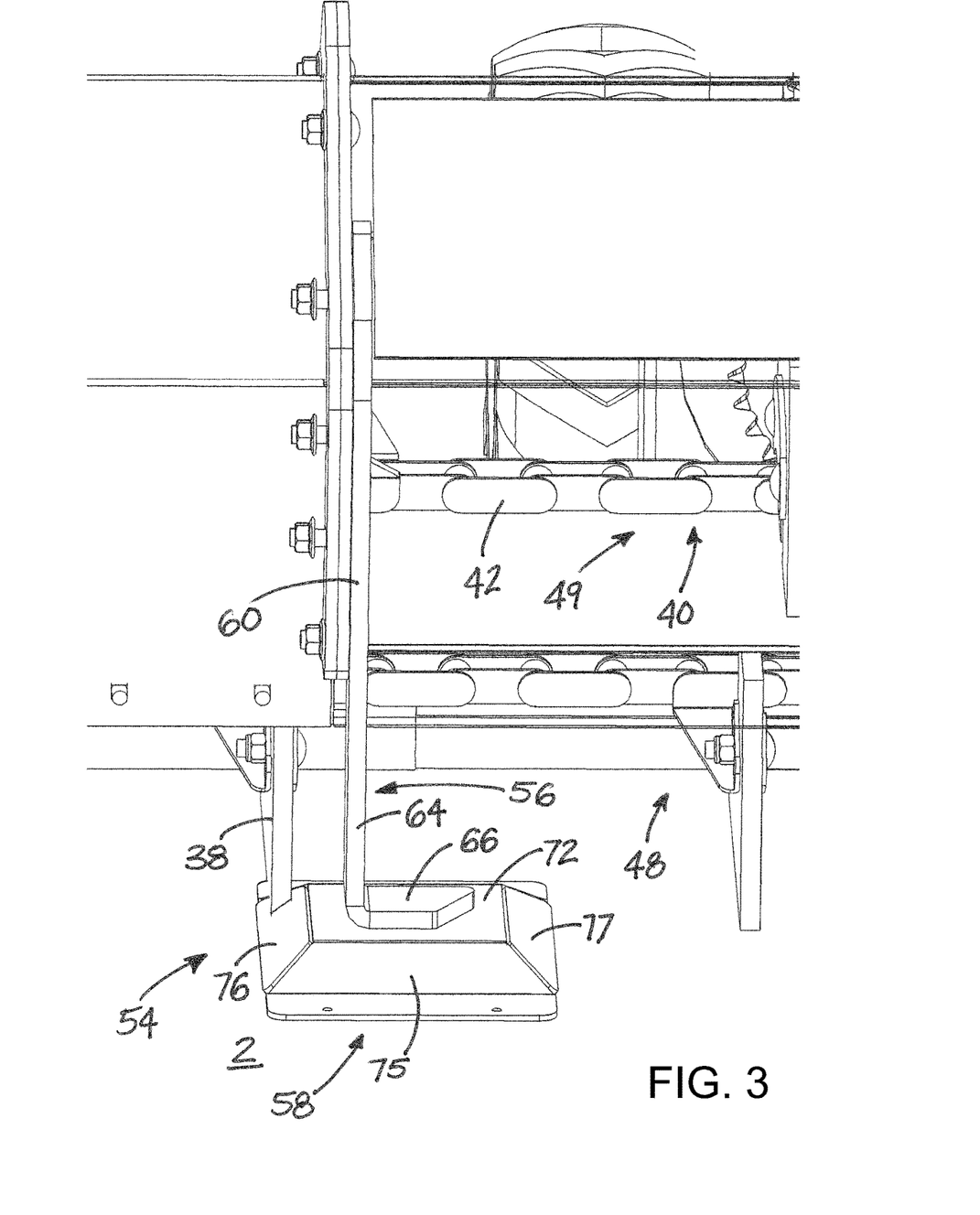
FIG. 3 is a schematic side view of the sweep assembly in the parked position with the sweep-mounted structure engaging the floor-mounted structure, according to an illustrative embodiment.
Figure 4:
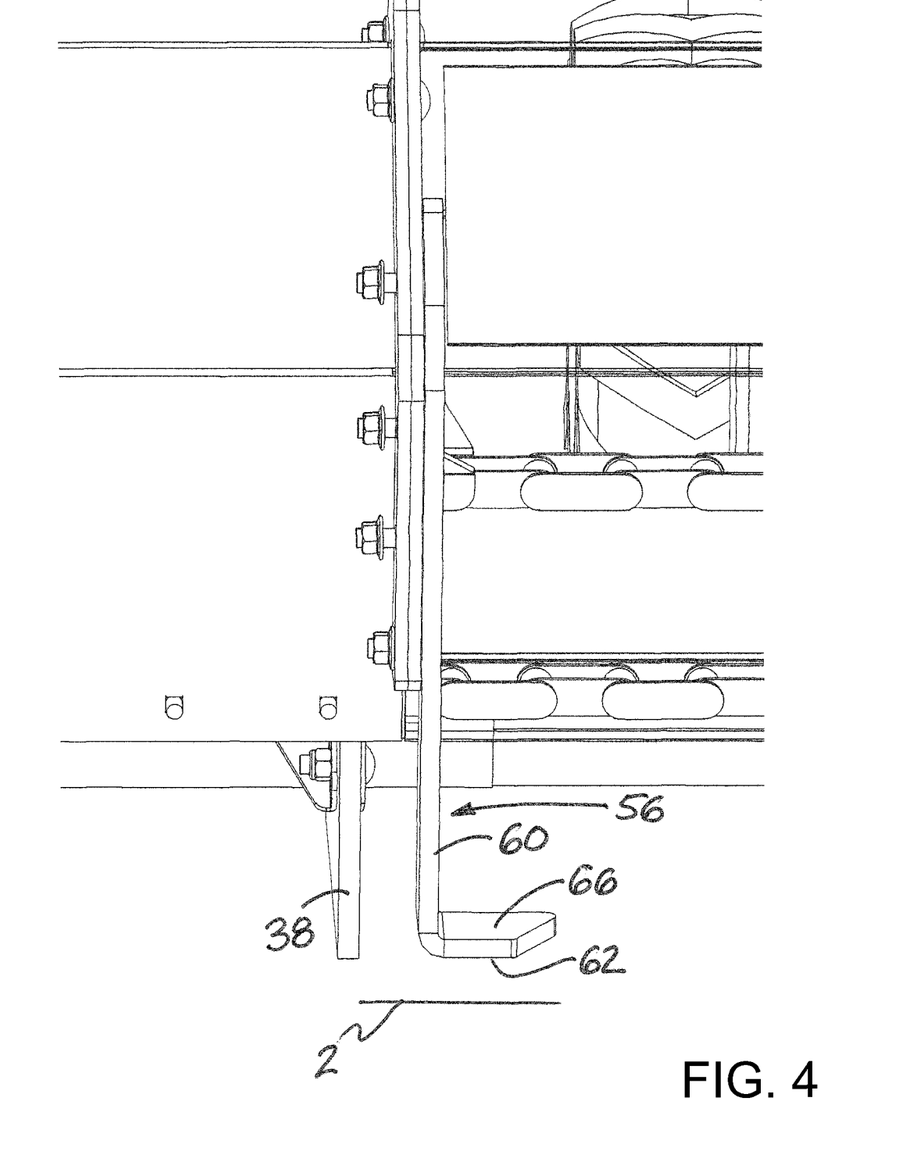
FIG. 4 is a schematic side view of the sweep assembly out of the parked position with the sweep-mounted structure being disengaged from the floor-mounted structure with a gap being formed between the sweep-mounted structure and the floor surface, according to an illustrative embodiment.

In some of the illustrative embodiments of the system 10, the support assembly comprises a sweep-mounted component 56 and a floor-mounted component 58. The sweep-mounted component 56 may move with the sweep assembly along the sweep path 6, and may extend toward the bin floor surface 2. The floor-mounted component 58 may extend upwardly from the floor surface 2. The sweep-mounted component may have a fixed distance of extension toward the bin floor, or at least one that does not need to be adjusted once set at assembly of the sweep assembly in the bin. The floor-mounted component 58 may have a fixed distance of extension upwardly from the floor surface. The sweep-mounted component 56 may be stationary with respect to the sweep assembly, and may be non-rotatable with respect to the housing 20. The floor-mounted component 58 may be stationary with respect to movement of the sweep assembly along the sweep path, and may be immovably mounted on the floor. The sweep-mounted component 56 may engage the floor-mounted component 58 when the sweep assembly is in the park position, and may contact the floor-mounted component when engaged at the park position. The sweep-mounted component 56 may rest upon the floor-mounted component 58 when the sweep assembly is in the park position.

In some embodiments, including the illustrative embodiments, the sweep-mounted component 56 comprises a leg 60 that extends downwardly from the housing 20 of the sweep assembly. The leg 60 may be mounted on the housing in a manner that is non-movable with respect to the housing, although the leg and/or housing may be structured so that some initial adjustment of the extent of the leg is possible. Legs may be mounted on the forward and rearward sides of the housing, as well as locations between the forward and rearward sides if desired. One highly suitable manner of installation is to mount the leg onto the housing utilizing the fasteners used to connect the sections of the housing together at the junctures 34, although other suitable ways of attaching the leg may also be used.

Figure 5:
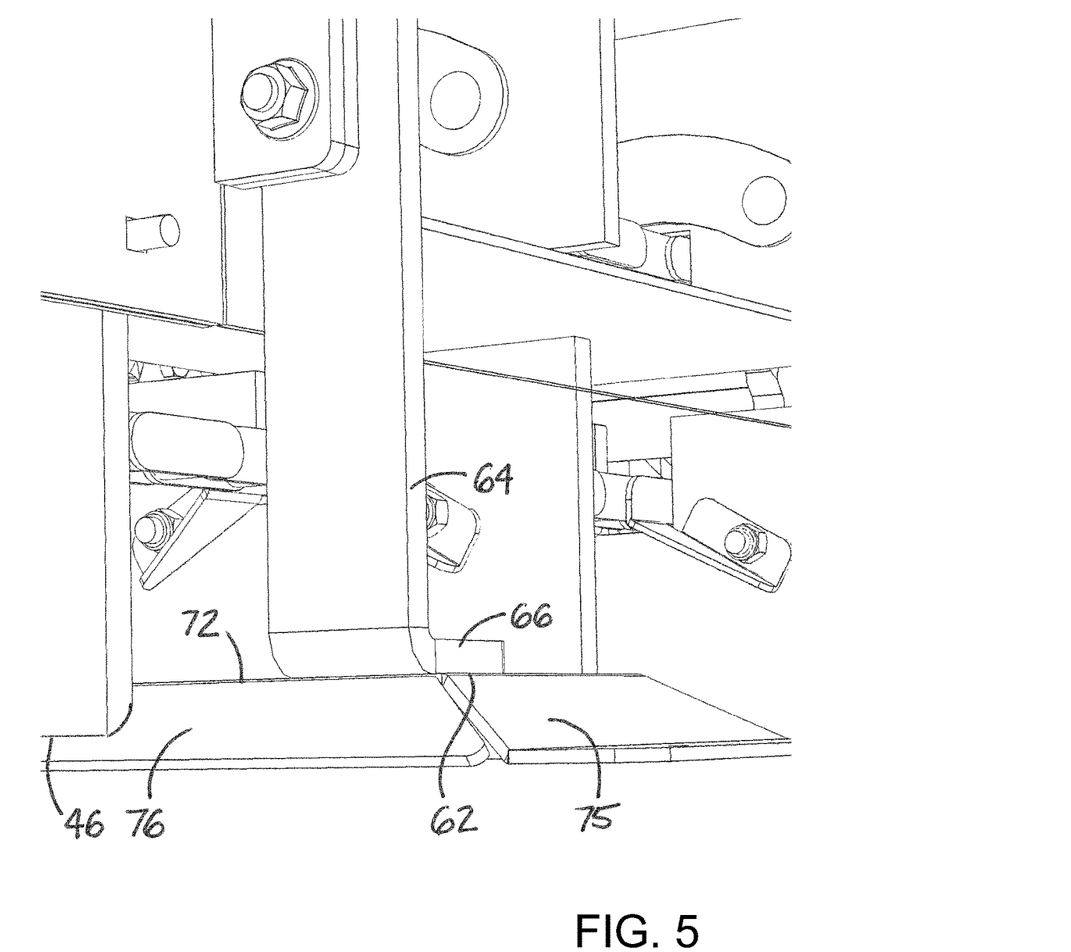
FIG. 5 is a schematic side view of the sweep assembly and sweep support showing the leg resting on the pedestal as the sweep assembly is in the park position, according to an illustrative embodiment.
Figure 6:
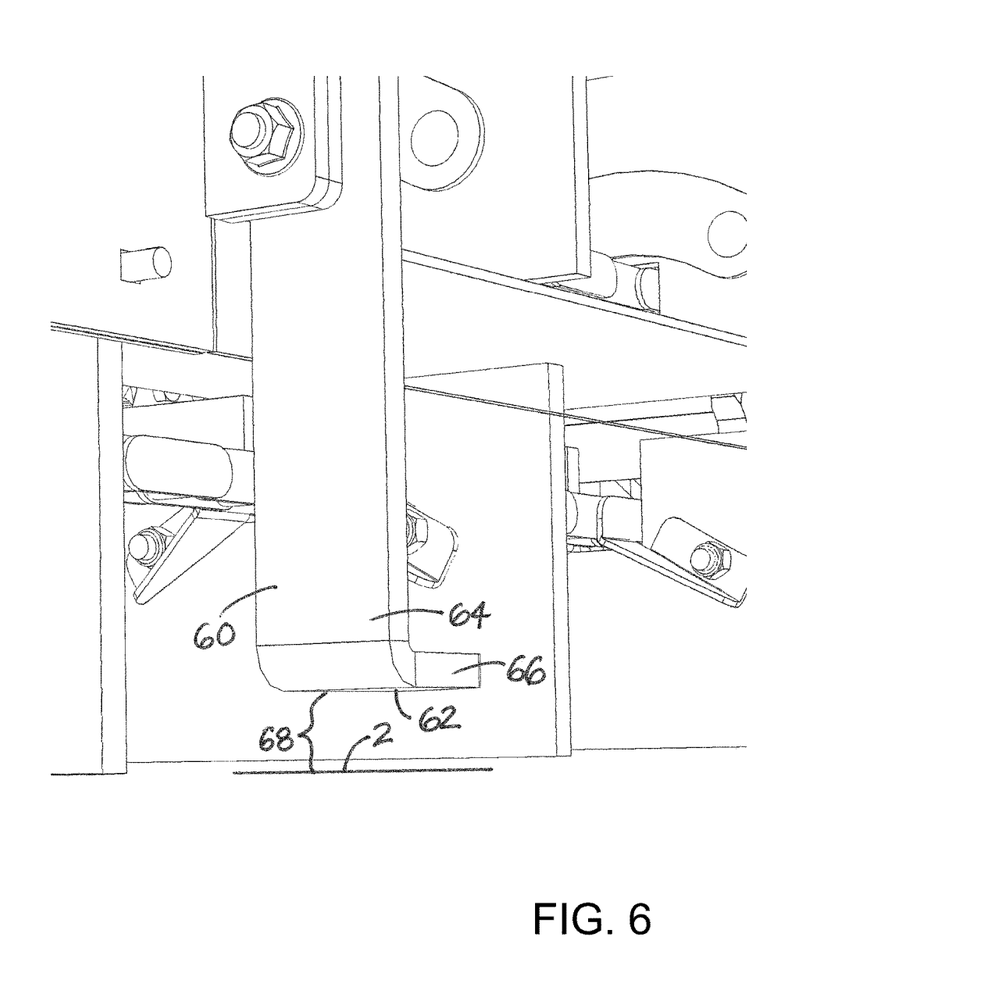
FIG. 6 is a schematic side view of the sweep assembly and sweep support showing the leg disengaged from the pedestal as the sweep assembly is moved out of the park position, according to an illustrative embodiment.

The leg 60 may have a lower surface 62 for contacting and resting upon the floor-mounted component 58. The leg 60 may include a main portion 64 and a foot portion 66, with the lower surface 62 being located on the foot portion in some embodiments to provide a longer surface area that may act as a skid. The main portion 642 may extend substantially vertically and the foot portion 66 may extend substantially horizontally although this is not critical. The foot portion 66 may extend in the rearward direction from the main portion such that the transition between the main and foot portions may form a curved surface for initially engaging the floor-mounted component. The lower surface 62 may form a lowermost surface on the leg and may be separated by a gap 68 from the floor surface 2. The gap may have a magnitude between the lower surface 62 and the plane of the floor surface that is less than approximately 5 inches, and may be less than 2 inches. In some preferred embodiments, the magnitude of the gap may be from approximately 0.5 inches to approximately 2 inches. In some of the most preferred embodiments, the gap measures approximately 1 inch. There may be a gap between the lower surface 62 and the floor surface 2 during most of the movement of the sweep assembly along the sweep path 6.

Figure 7:
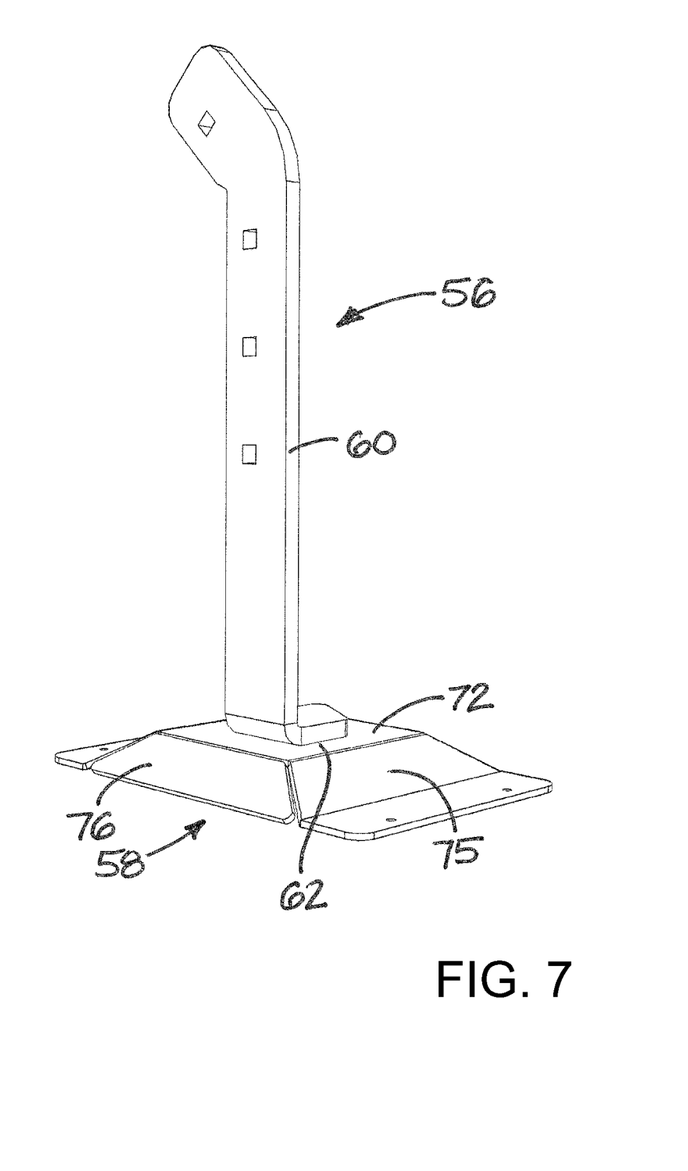
FIG. 7 is a schematic perspective view of the support assembly in the support condition, according to an illustrative embodiment.

In some embodiments, the floor-mounted component 58 comprises a pedestal 70 for engaging the leg 60 of the sweep-mounted component, and more specifically the lower surface on the leg. The pedestal 70 may have a raised surface 72 for positioning the leg 60 thereon when the leg engages the pedestal, such as when the sweep assembly is in the parked position. The raised surface 72 may be oriented substantially parallel to the plane of the floor surface of the bin, although this orientation is not critical. The pedestal 70 has a height which may be substantially equal to the magnitude of the gap 68 or may be slightly or somewhat larger than the gap in order to slightly raise the leg upwardly when the leg engages the pedestal which may have the effect of lifting the housing slightly and taking some of the weight of the sweep assembly off of the paddles.

Figure 8:
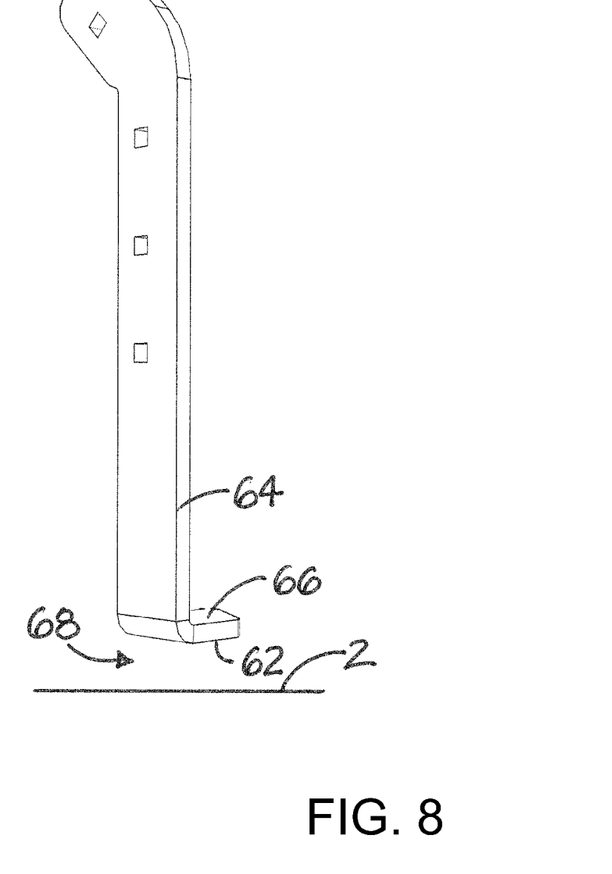
FIG. 8 is a schematic perspective view of the support assembly in the non-support condition, according to an illustrative embodiment.
Figure 9:
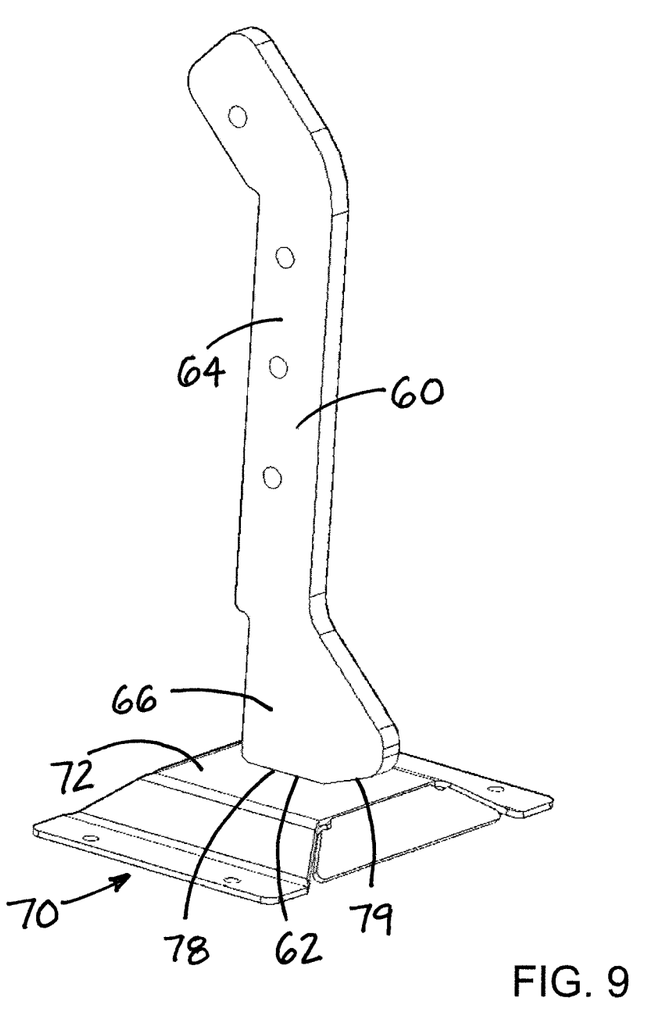
FIG. 9 is a schematic perspective view of a support assembly in the support condition, according to another illustrative embodiment.
Figure 10:
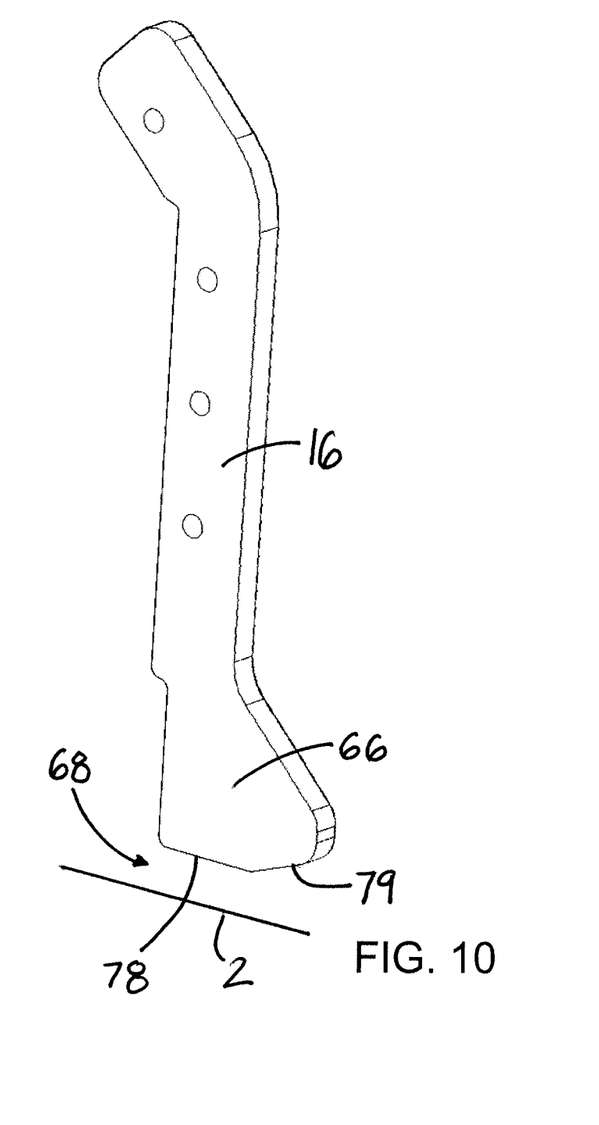
FIG. 10 is a schematic perspective view of the support assembly of FIG. 9 in the non-support condition.
Figure 11:
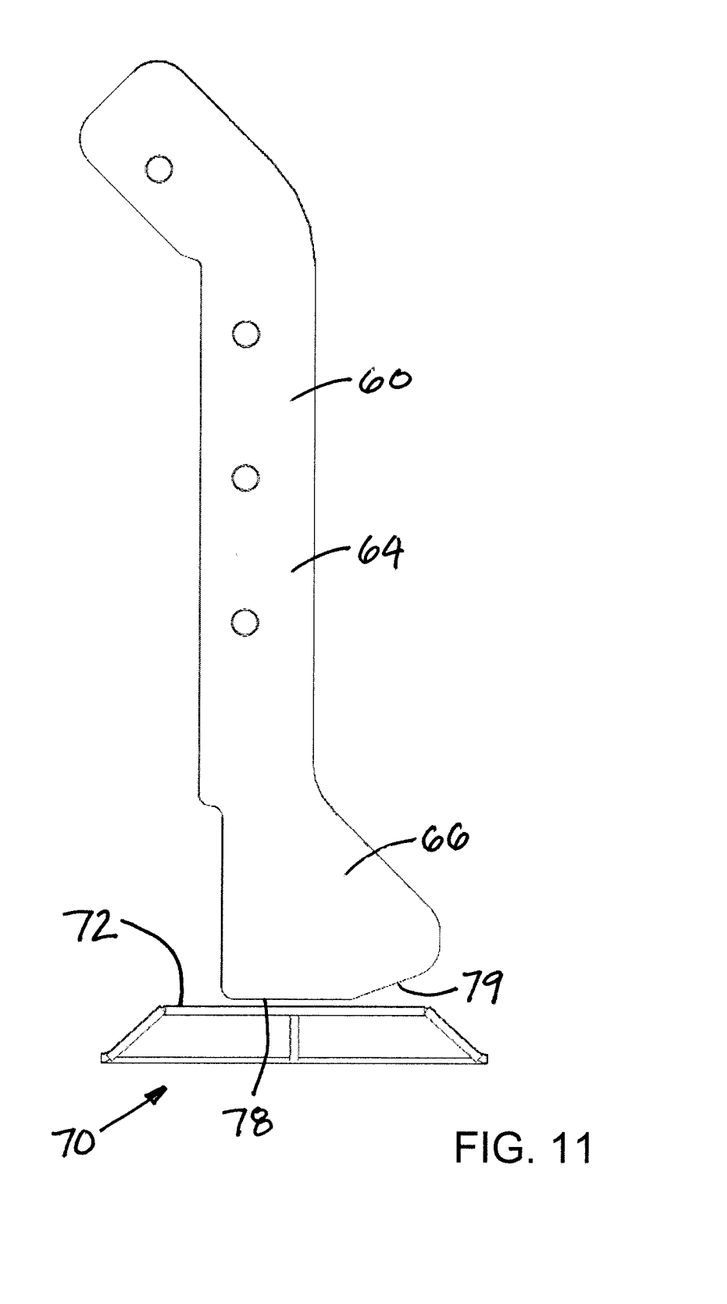
FIG. 11 is a schematic sectional view of the support assembly of FIG. 9 in the support condition.
Figure 12:
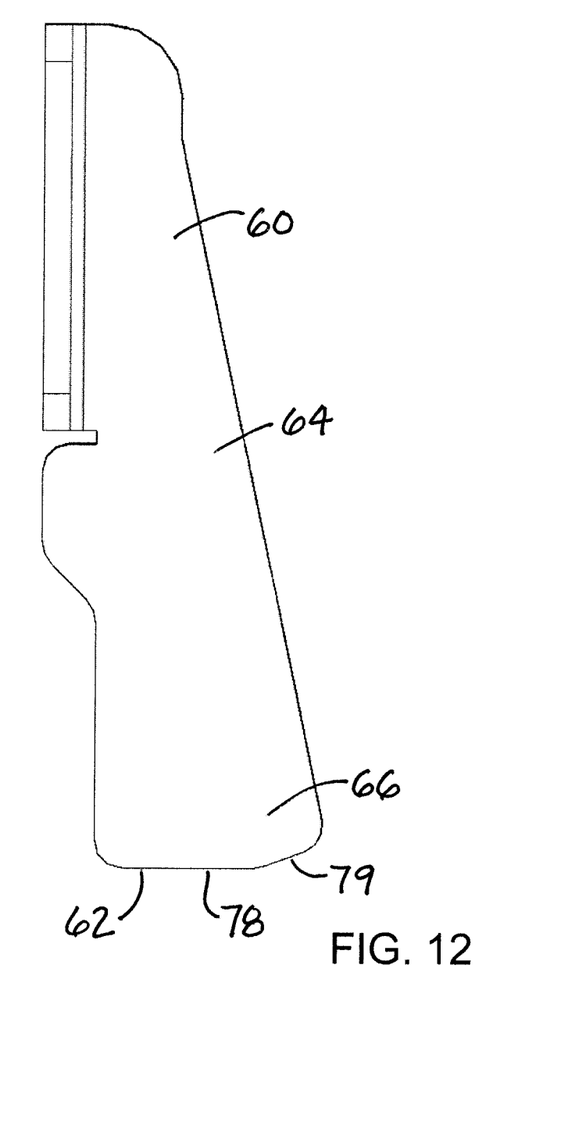
FIG. 12 is a schematic side view of the leg of a support assembly, according to an illustrative embodiment.

The pedestal 70 may have at least one side surface 74 that extends from the raised surface 72 toward the floor surface 2. The side surface 74 may be sloped downwardly from the raised surface to the floor surface, which may facilitate movement of the lower surface of the foot portion onto the raised surface of the pedestal. In some embodiments, a first pair of the side surfaces 74, 75 are located at opposite sides of the raised surface 72 such that the leg 60 is able to slide up and down the side surfaces as the sweep assembly moves along the sweep path. A second pair of side surfaces 76, 77 may be located at opposite sides of the raised surface which may facilitate movement of the paddles of the inbound extent 48 are able to slide up and down the side surfaces of the pedestal as the endless loop moves over the pedestal. The pedestal may be formed of any suitable material, and some suitable examples include formed or welded metal and molded plastic.

A plurality of support assemblies 54 may be positioned at spaced locations on the sweep assembly to provide support to the sweep assembly when the sweep assembly is "parked," or in the park position. A plurality of legs may be positioned at spaced locations on the housing and a plurality of pedestals may be positioned on the floor surface in locations that align with legs when the sweep assembly is in the park position such that the sweep assembly is primarily supported by the support assemblies and the sweep drive assembly or assemblies when parked in the park position. In some embodiments, the support assemblies may be arrayed along the forward and rearward sides of the housing in substantially equidistant spacings.

Using one or more of the supports assemblies of the disclosure, the sweep assembly may be operated to move the sweep assembly from the park position without having to manipulate the jacks before starting operation. Movement of the sweep assembly from the park position disengages the sweep-mounted components from the floor-mounted components (such as the legs from the pedestals), and the sweep-mounted components remain free of the floor-mounted components, and the floor surface, until the sweep assembly moves back into the park position and the legs encounter the pedestals.

The leg of the support assembly may have any suitable configuration, and may be configured and shaped for enhancing the suitability for various purposes. FIGS. 9 through 12 show various leg configurations that do not include the foot portion of the leg being formed by a bent portion of the piece, and instead the foot portion is formed by an edge 78 of the piece forming the leg with a suitable thickness based upon the strength and rigidity of the material forming the leg. These leg configurations have the advantage of being able to be formed by an unbent piece of sheet material which generally requires less fabrication cost. Further, the toe edge 79 of the foot portion may be shaped in a manner that facilitates the slippage of the foot portion of the leg onto the pedestal 70 and may also decrease the possibility of the foot portion becoming tangled or caught on debris or loose floor panels as the sweep moves over the bin floor. The toe edge 79 may be, for example, have a profile that is tilted or sloped in an upward direction and may also have a curvilinear shape to assist the edge 79 sliding up and over obstructions, high spots in the floor, and the pedestal.

It should be appreciated that in the foregoing description and appended claims, that the terms "substantially" and "approximately," when used to modify another term, mean "for the most part" or "being largely but not wholly or completely that which is specified" by the modified term.

It should also be appreciated from the foregoing description that, except when mutually exclusive, the features of the various embodiments described herein may be combined with features of other embodiments as desired while remaining within the intended scope of the disclosure.

With respect to the above description then, it is to be realized that the optimum dimensional relationships for the parts of the disclosed embodiments and implementations, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present disclosure.

Therefore, the foregoing is considered as illustrative only of the principles of the disclosure. Further, since numerous modifications and changes will readily occur to those skilled in the art, it is not desired to limit the disclosed subject matter to the exact construction and operation shown and described, and accordingly, all suitable modifications and equivalents may be resorted to that fall within the scope of the claims.

I claim:

1. A bin sweep system for a bin having a floor surface and a central well, the system comprising:
 a sweep assembly configured to move in a forward direction across the floor surface, the sweep assembly having an inboard end for positioning toward the central well of the bin and an outboard end of the sweep assembly, the sweep assembly being rotatable along a sweep path, the sweep path including a plurality of positions of the bin sweep, the sweep assembly comprising:
  a housing having a longitudinal axis extending between the inboard and outboard ends of the sweep assembly, the longitudinal axis defining a longitudinal direction for the housing;
  a particulate sweep assembly mounted on the housing and configured to move particulate matter across the floor surface toward the central well;

a sweep drive assembly mounted on the housing and configured to move the sweep assembly across the floor surface;

at least one support assembly, the at least one support assembly having a support condition characterized by the support assembly providing support to the housing of the sweep assembly and a non-support condition characterized by the support assembly not providing support to the housing;

wherein the support assembly changes from the support condition to the non-support condition by movement of the sweep assembly along the sweep path; and wherein the at least one support assembly is positioned on the housing at a location spaced in the longitudinal direction from the outboard end of the sweep assembly.

2. The system of claim 1 wherein the support assembly changes from the non-support condition to the support condition by movement of the sweep assembly along the sweep path.

3. The system of claim 1 wherein the support assembly only provides support for the housing of the sweep assembly at intermittent positions of the sweep assembly along the sweep path.

4. The system of claim 1 wherein the support assembly only provides support to the housing of the sweep assembly at a single position of the bin sweep.

5. The system of claim 1 wherein the support assembly provides support to the housing of the sweep assembly at a park position of the sweep assembly along the sweep path.

6. The system of claim 5 wherein the park position is located adjacent to an intermediate sump in the bin floor.

7. The system of claim 1 wherein the support assembly comprising a sweep-mounted component moving with the sweep assembly along the sweep path and a floor-mounted component being stationary with respect to movement of the sweep assembly along the sweep path.

8. The system of claim 7 wherein the sweep-mounted component is mounted on the housing and extends downwardly and the floor-mounted component extends upwardly from the floor surface.

9. The system of claim 7 wherein the sweep-mounted component engages the floor-mounted component when the sweep assembly is in a park position of the sweep assembly along the sweep path.

10. The system of claim 7 wherein the sweep-mounted component rests upon the floor-mounted component when the sweep assembly is in the park position.

11. The system of claim 7 wherein the sweep-mounted component comprises an elongate leg extending downwardly from the housing of the sweep assembly and having a lower surface, the floor-mounted component comprising a pedestal immovably mounted on the floor with a raised surface raised with respect to a plane of the floor surface, the lower surface of the leg resting upon the raised surface of the pedestal when the sweep assembly is in a park position of the sweep path.

12. The system of claim 11 wherein the lower surface of the leg is removed from the raised surface of the pedestal when the sweep assembly is moved from a park position.

13. The system of claim 11 wherein the lower surface of the leg is separated by a gap from the floor surface when the sweep assembly is moved from the park position of the sweep path.

14. The system of claim 13 wherein the raised surface of the pedestal has a height above the plane of the floor surface, the height of the raised surface being substantially equal to the magnitude of the gap.

15. The system of claim 11 wherein the pedestal has at least one side surface extending from the raised surface to the floor surface, the at least one side surface being sloped downwardly from the raised surface to the floor surface.

16. The system of claim 1 wherein the at least one support assembly comprises a plurality of support assemblies positioned at spaced longitudinal locations along the housing.

17. The system of claim 16 wherein the support assemblies include a plurality of legs on the housing and a plurality of pedestals on the floor surface, each of the legs aligning with one of the pedestals when the sweep assembly is in a park position of the sweep path.

18. The system of claim 1 wherein the sweep drive assembly includes at least one wheel configured to contact the floor surface, the at least one wheel being positioned longitudinally closer to the outboard end than the at least one support assembly.

19. A bin sweep system for a bin having a floor surface and a central well adjacent to a central post, the system comprising:

a sweep assembly configured to move in a forward direction with respect to and across the floor surface, the sweep assembly having an inboard end for positioning toward the central well and rotating about the central post of the bin when the sweep moves in the forward direction, the sweep assembly having an outboard end moving relative to the floor surface as the sweep assembly moves in the forward direction to define a substantially circular outer perimeter of a sweep path about the center post, the sweep path including a plurality of positions of the sweep assembly, the sweep assembly comprising:

a housing having a longitudinal axis extending between the inboard and outboard ends of the sweep assembly;

a particulate sweep assembly mounted on the housing and configured to move particulate matter across the floor surface toward the central well;

a sweep drive assembly mounted on the housing and configured to move the sweep assembly across the floor surface; and at least one support assembly comprising an elongate leg extending downwardly from the housing of the sweep assembly and having a lower surface, and a pedestal immovably mounted on the floor with a raised surface raised with respect to a plane of the floor surface of the bin, the lower surface of the leg resting upon the raised surface of the pedestal when the sweep assembly is in a park position of the sweep path, the leg being removed from engagement from the pedestal when the sweep assembly is moved from the park position of the sweep path and a gap being formed between the lower surface of the leg and the floor surface; and wherein the at least one support assembly is positioned on the housing at a location between the inboard and outboard ends of the sweep assembly and at a location spaced longitudinally from the outboard end of the sweep assembly and from the inboard end of the sweep assembly; and wherein the sweep drive assembly includes at least one wheel configured to contact the floor surface, the at least one wheel being spaced from the at least one support assembly in a longitudinal direction defined by the longitudinal axis of the housing.

20. A bin sweep system for a bin having a floor surface and a central well adjacent to a central post, the system comprising:

a sweep assembly configured to move in a forward direction with respect to and across the floor surface, the sweep assembly having an inboard end for positioning toward the central well and configured to rotate about the central post of the bin when the sweep moves in the forward direction, the sweep assembly having an outboard end configured to move along a substantially circular perimeter path relative to the floor surface as the sweep assembly moves in the forward direction to define a substantially circular outer perimeter of a sweep path about the center post, the sweep path including a plurality of positions of the sweep assembly, the sweep assembly comprising:

a housing having a longitudinal axis extending between the inboard and outboard ends of the sweep assembly;

a particulate sweep assembly mounted on the housing and configured to move particulate matter across the floor surface toward the central well;

a sweep drive assembly mounted on the housing and configured to move the sweep assembly across the floor surface;

a plurality of support assemblies having a support condition characterized by the support assemblies providing support to the housing of the sweep assembly and a non-support condition characterized by the support assemblies not providing support to the housing;

wherein the support assemblies change from the support condition to the non-support condition by movement of the sweep assembly along the sweep path;

wherein support assemblies of said plurality of support assemblies are positioned on the housing at locations between the inboard and outboard ends of the sweep assembly; and wherein the sweep drive assembly includes at least one wheel configured to contact the floor surface, the at least one wheel being separated from each of the support assemblies in a longitudinal direction defined by the longitudinal axis of the housing.

* * * * *